United States Patent
Kim

(10) Patent No.: US 11,425,552 B2
(45) Date of Patent: Aug. 23, 2022

(54) METHOD OF CONNECTION CONTROL FOR DIRECT COMMUNICATION BETWEEN TERMINALS, AND APPARATUS THEREFOR

(71) Applicant: Electronics and Telecommunications Research Institute, Daejeon (KR)

(72) Inventor: Jae Heung Kim, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 83 days.

(21) Appl. No.: 16/988,245

(22) Filed: Aug. 7, 2020

(65) Prior Publication Data

US 2021/0044956 A1 Feb. 11, 2021

(30) Foreign Application Priority Data

| Aug. 9, 2019 | (KR) | 10-2019-0097281 |
| Nov. 4, 2019 | (KR) | 10-2019-0139663 |
| Jun. 9, 2020 | (KR) | 10-2020-0069775 |
| Jul. 14, 2020 | (KR) | 10-2020-0086660 |

(51) Int. Cl.
| H04W 8/00 | (2009.01) |
| H04W 76/14 | (2018.01) |
| H04L 1/18 | (2006.01) |
| H04W 76/27 | (2018.01) |

(52) U.S. Cl.
CPC ........... H04W 8/005 (2013.01); H04L 1/1812 (2013.01); H04W 76/14 (2018.02); H04W 76/27 (2018.02)

(58) Field of Classification Search
CPC ....... H04W 8/005; H04W 8/24; H04W 76/14; H04W 76/27; H04W 48/12; H04L 1/1812; H04L 1/1854; H04L 1/1896
See application file for complete search history.

(56) References Cited

U.S. PATENT DOCUMENTS

| 10,420,126 B2 | 9/2019 | Kim et al. |
| 2014/0256369 A1 | 9/2014 | Ji et al. |
| 2016/0037569 A1 | 2/2016 | Kim et al. |
| 2016/0173239 A1* | 6/2016 | Kim ..................... H04L 1/1812 370/329 |
| 2016/0212682 A1 | 7/2016 | Chung et al. |
| 2017/0048906 A1 | 2/2017 | Lee et al. |
| 2017/0086081 A1 | 3/2017 | Kim et al. |
| 2018/0035276 A1 | 2/2018 | Kang et al. |
| 2020/0229249 A1* | 7/2020 | Cheng ................. H04W 76/27 |
| 2021/0297830 A1* | 9/2021 | Osawa ................. H04W 76/14 |
| 2022/0077984 A1* | 3/2022 | Lee ....................... H04L 5/0048 |

* cited by examiner

*Primary Examiner* — Farid Seyedvosoghi
(74) *Attorney, Agent, or Firm* — William Park & Associates Ltd.

(57) ABSTRACT

A method of establishing a connection for direct communication between terminals, performed in a terminal, may comprise transmitting a sensing signal or a sidelink discovery signal; transmitting sidelink discovery information; receiving a response to the sidelink discovery signal or the sidelink discovery information from a peer terminal; determining a cast type for the peer terminal, and establishing a PC5-radio resource control (RRC) connection with the peer terminal when the cast type is determined to be a unicast scheme or groupcast scheme; and performing direct communication with the peer terminal.

20 Claims, 7 Drawing Sheets

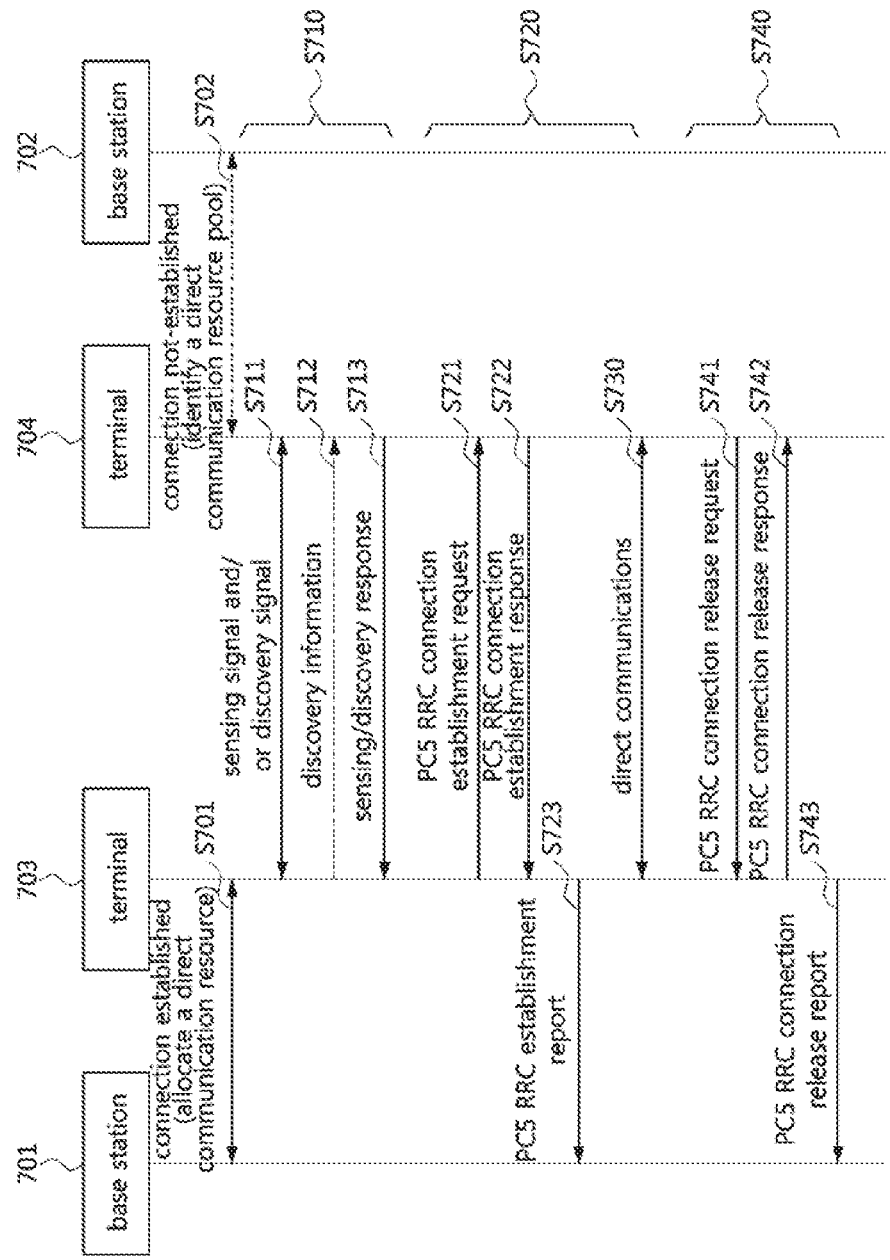

METHOD OF CONNECTION CONTROL FOR DIRECT COMMUNICATION BETWEEN TERMINALS, AND APPARATUS THEREFOR

CROSS-REFERENCE TO RELATED APPLICATIONS

This application claims priority to Korean Patent Applications No. 10-2019-0097281 filed on Aug. 9, 2019, No. 10-2019-0139663 filed on Nov. 4, 2019, No. 10-2020-0069775 filed on Jun. 9, 2020, and No. 10-2020-0086660 filed on Jul. 14, 2020 with the Korean Intellectual Property Office (KIPO), the entire contents of which are hereby incorporated by reference.

BACKGROUND

1. Technical Field

The present disclosure relates generally to direct communication between terminals in a high frequency band based mobile communication system, and more specifically, to a method for efficient radio resource allocation and connection control, which satisfies user and service performance requirements needed for a radio link for the direct communication between terminals, and an apparatus for the same.

2. Related Art

In order to cope with the explosion of wireless data, a mobile communication system considers a terminal apparatus supporting a 6 GHz to 90 GHz band as a transmission frequency for a wide system bandwidth. Further, a method for establishing a direct radio link between terminals to provide services is being considered in addition to a method for establishing a radio link connection with a base station (or cell), a node to which functional split is applied, or a relay node to provide services.

As described above, operation and control procedures are required to support radio resource allocation, connection control, efficient radio link monitoring, and measurement functions for connection establishment/management of a radio link for direct communication between terminals for connected vehicles as well as general user terminals based on a mobile communication system.

SUMMARY

Accordingly, exemplary embodiments of the present disclosure are directed to providing a connection control method for direct communication between terminals.

Accordingly, exemplary embodiments of the present disclosure are directed to providing a terminal apparatus of performing a connection control method for direct communication between terminals.

According to an exemplary embodiment of the present disclosure, a method of establishing a connection for direct communication between terminals, performed in a terminal, may comprise transmitting a sensing signal or a sidelink discovery signal; transmitting sidelink discovery information; receiving a response to the sidelink discovery signal or the sidelink discovery information from a peer terminal; determining a cast type for the peer terminal, and establishing a PC5-radio resource control (RRC) connection with the peer terminal when the cast type is determined to be a unicast scheme or groupcast scheme; and performing direct communication with the peer terminal.

The method may further comprise establishing an RRC connection with a base station; and being allocated a radio resource from the base station, wherein the sensing signal or the sidelink discovery signal is transmitted through the radio resource.

The method may further comprise identifying a preconfigured a radio resource pool or receiving configuration information of a radio resource pool, wherein the sensing signal or the sidelink discovery signal is transmitted through a radio resource selected from the radio resource pool.

The sensing signal may be a signal for radio link monitoring (RLM), radio resource management (RRM), detection of a radio link failure (RLF), or beam management.

The sidelink discovery signal may be a reference signal having a specific pattern or a signal configured with a specific sequence.

The sidelink discovery signal may be transmitted in a preconfigured region of subcarriers according to a preconfigured periodicity, and the preconfigured periodicity and/or the preconfigured region of subcarriers may be informed by a base station through system information or a control message.

The discovery information may include a layer 1 (L1) or layer 2 (L2) identifier (ID) of a source terminal, an L1 or L2 ID of a destination terminal, and/or an L1 or L2 ID of a destination terminal group.

The cast type may be identified by an L1 or L2 ID of a source terminal, an L1 or L2 ID of a destination terminal, and/or an L1 or L2 ID of a destination terminal group, identified by a format of sidelink control information (SCI) transmitted to the peer terminal or received from the peer terminal or by an indicator included in the SCI, or identified by a hybrid automatic repeat request (HARQ) retransmission scheme for the peer terminal or radio resource allocation information for transmission of HARQ feedback information for the peer terminal.

The establishing of the PC5-RRC connection with the peer terminal may comprise transmitting a control message requesting to establish the PC5-RRC connection to the peer terminal; and receiving a response message for accepting or rejecting the establishment of the PC5-RRC connection from the peer terminal.

The control message requesting to establish the PC5-RRC connection may include at least one of capability information of the terminal, an identifier and configuration information of the terminal, sidelink channel configuration information, version information of a direct communication function specification, and mobility status information of the terminal.

According to another exemplary embodiment of the present disclosure, a method of establishing a connection for direct communication between terminals, performed in a terminal, may comprise monitoring a sensing signal or a sidelink discovery signal; receiving sidelink discovery information from a peer terminal; transmitting a response to the sidelink discovery signal or the sidelink discovery information; establishing a PC5-radio resource control (RRC) connection with the peer terminal; and performing direct communication with the peer terminal.

The terminal may recognize the peer terminal through monitoring on the sensing signal or the sidelink discovery signal, and receive the sidelink discovery information from the peer terminal.

The sensing signal may be a signal for radio link monitoring (RLM), radio resource management (RRM), detection of a radio link failure (RLF), or beam management.

The sidelink discovery signal may be a reference signal having a specific pattern or a signal configured with a specific sequence.

The sidelink discovery signal may be received in a preconfigured region of subcarriers according to a preconfigured periodicity, and the preconfigured periodicity and/or the preconfigured region of subcarriers may be informed by a base station through system information or a control message.

The discovery information may include a layer 1 (L1) or layer 2 (L2) identifier (ID) of a source terminal, an L1 or L2 ID of a destination terminal, and/or an L1 or L2 ID of a destination terminal group.

According to yet another exemplary embodiment of the present disclosure, a terminal for performing direct communication between terminals may comprise a processor; a memory electronically communicating with the processor; and instructions executable by the processor and stored in the memory, wherein when executed by the processor, the instructions cause the terminal to: transmit a sensing signal or a sidelink discovery signal; transmit sidelink discovery information; receive a response to the sidelink discovery signal or the sidelink discovery information from a peer terminal; determine a cast type for the peer terminal, and establish a PC5-radio resource control (RRC) connection with the peer terminal when the cast type is determined to be a unicast scheme or groupcast scheme; and perform direct communication with the peer terminal.

The sidelink discovery signal may be a reference signal having a specific pattern or a signal configured with a specific sequence.

The sidelink discovery signal may be transmitted in a preconfigured region of subcarriers according to a preconfigured periodicity, and the preconfigured periodicity and/or the preconfigured region of subcarriers may be informed by a base station through system information or a control message.

The cast type may be identified by an L1 or L2 ID of a source terminal, an L1 or L2 ID of a destination terminal, and/or an L1 or L2 ID of a destination terminal group, identified by a format of sidelink control information (SCI) transmitted to the peer terminal or received from the peer terminal or by an indicator included in the SCI, or identified by a hybrid automatic repeat request (HARQ) retransmission scheme for the peer terminal or radio resource allocation information for transmission of HARQ feedback information for the peer terminal.

According to the exemplary embodiments according to the present disclosure, radio resource allocation, connection control, radio link monitoring, and measurement functions for connection establishment/management of a radio link for direct communication between terminals can be efficiently performed.

BRIEF DESCRIPTION OF DRAWINGS

Exemplary embodiments of the present disclosure will become more apparent by describing in detail embodiments of the present disclosure with reference to the accompanying drawings, in which:

FIG. 7 is a sequence chart illustrating an exemplary embodiment of a method for establishing a connection between terminals for direct communication according to the present disclosure.

Figure 1:
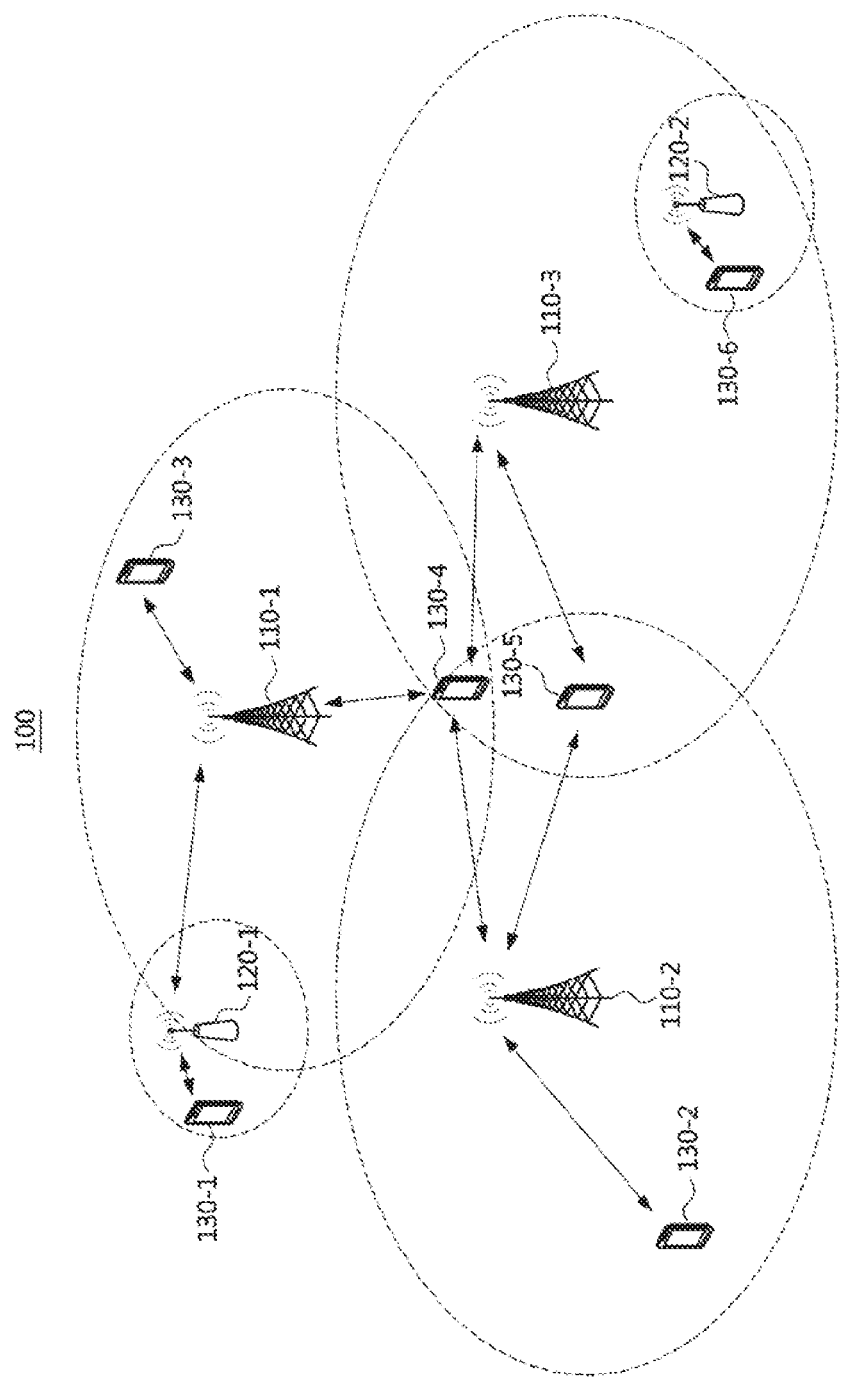
FIG. 1 is a conceptual diagram illustrating a first exemplary embodiment of a wireless communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present disclosure will be described in greater detail with reference to the accompanying drawings. To facilitate overall understanding of the present disclosure, like numbers refer to like elements throughout the description of the drawings, and description of the same component will not be reiterated.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks. Here, the wireless communication network may be used in the same sense as a wireless communication system.

FIG. 1 is a conceptual diagram illustrating a first exemplary embodiment of a wireless communication network.

Referring to FIG. 1, a wireless communication network 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a space division multiple access (SDMA) based communication protocol, or the like. Each of the plurality of communication nodes may have the following structure.

Figure 2:
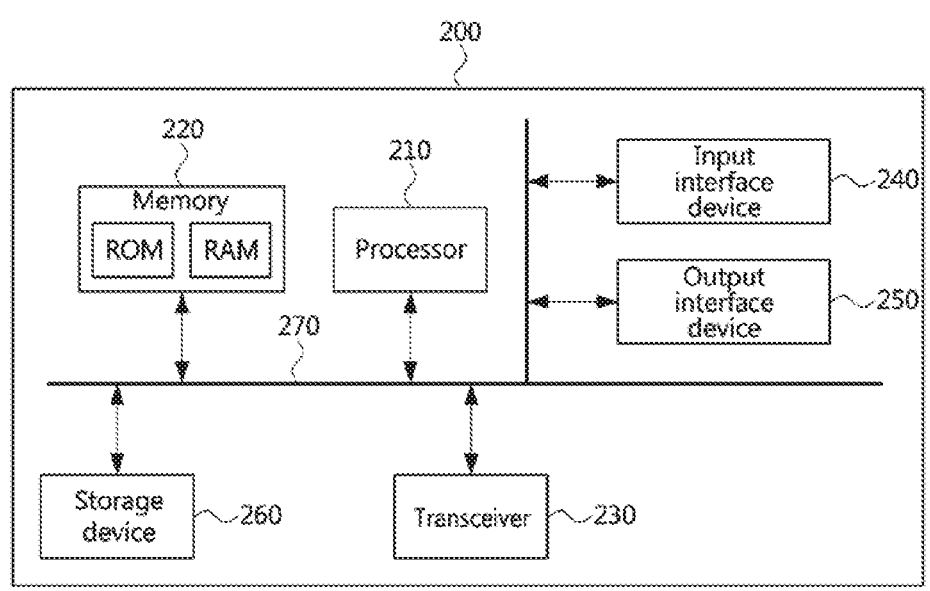
FIG. 2 is a block diagram illustrating a first exemplary embodiment of a communication node constituting a wireless communication network.

FIG. 2 is a block diagram illustrating a first exemplary embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the wireless communication network 100 may comprise a plurality of base stations 110-1, 110-2, 110-3, 120-1, and 120-2, and a plurality of user equipments (UEs) 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third UE 130-3, and the fourth UE 130-4 may belong to cell coverage of the first base station 110-1. The second UE 130-2, the fourth UE 130-4, and the fifth UE 130-5 may belong to cell coverage of the second base station 110-2. Also, the fifth base station 120-2, the fourth UE 130-4, the fifth UE 130-5, and the sixth UE 130-6 may belong to cell coverage of the third base station 110-3. The first UE 130-1 may belong to cell coverage of the fourth base station 120-1. The sixth UE 130-6 may belong to cell coverage of the fifth base station 120-2.

Here, each of the plurality of base stations 110-1, 110-2, 110-3, 120-1 and 120-2 may refer to a node B (NodeB), an evolved NodeB (eNB), a base transceiver station (BTS), a radio base station, a radio transceiver, an access point, an access node, or the like. Each of the plurality of UEs 130-1, 130-2, 130-3, 130-4, 130-5 and 130-6 may refer to a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support a cellular communication (e.g., long term evolution (LTE), LTE-A (advanced), etc. defined in the 3rd generation partnership project (3GPP) standard), or wireless protocol specifications of mmWave (e.g., 6 GHz to 80 GHz band) based wireless access technology. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network (not shown) through the ideal or non-ideal backhaul. Each of the plurality of base stations 110-1, 110-2, 110-3, 120-1, and 120-2 may transmit a signal received from the core network to the corresponding UE 130-1, 130-2, 130-3, 130-4, 130-5, or 130-6, and transmit a signal received from the corresponding UE 130-1, 130-2, 130-3, 130-4, 130-5, or 130-6 to the core network.

In addition, each of the plurality of base stations 110-1, 110-2, 110-3, 120-1, 120-2, 310, 330, 471, and 472 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communication (or, proximity services (ProSe)), or the like. Here, each of the plurality of UEs 130-1, 130-2, 130-3, 130-4, 130-5, 130-6, 410-1, 410-2, 410-3, and 410-4 may perform operations corresponding to the operations of the plurality of base stations 110-1, 110-2, 110-3, 120-1, and 120-2, and operations supported by the plurality of base stations 110-1, 110-2, 110-3, 120-1, 120-2, 310, 330, 431-3, and 431-4. For example, the second base station 110-2 may transmit a signal to the fourth UE 130-4 in the SU-MIMO manner, and the fourth UE 130-4 may receive the signal from the second base station 110-2 in the SU-MIMO manner. Alternatively, the second base station 110-2 may transmit a signal to the fourth UE 130-4 and fifth UE 130-5 in the MU-MIMO manner, and each of the fourth UE 130-4 and fifth UE 130-5 may receive the signal from the second base station 110-2 in the MU-MIMO manner. Each of the first base station 110-1, the second base station 110-2, and the third base station 110-3 may transmit a signal to the fourth UE 130-4 in the CoMP transmission manner, and the fourth UE 130-4 may receive the signal from the first base station 110-1, the second base station 110-2, and the third base station 110-3 in the CoMP manner. Each of the plurality of base stations 110-1, 110-2, 110-3, 120-1, and 120-2 may exchange signals with the corresponding UEs 130-1, 130-2, 130-3, 130-4, 130-5, or 130-6 which belongs to its cell coverage in the CA manner. Each of the base stations 110-1, 110-2, and 110-3 may coordinate D2D communications between the fourth UE 130-4 and the fifth UE 130-5, and thus the fourth UE 130-4 and the fifth UE 130-5 may perform the D2D or V2X services under coordination of each of the second base station 110-2 and the third base station 110-3.

Hereinafter, operation methods of communication nodes in a mobile communication network will be described. Even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the following description, the SGW is a termination node of a core network for exchanging data packets with a base station providing services to a user terminal using a radio access protocol. Also, the MME is an entity in charge of a control function in a radio access section (or interface) for user terminals in a wireless communication network. Thus, in the following description, the present disclosure is not limited to the specific terms 'SGW' or 'MME'. That is, the above-described terms may be replaced with other terms indicating a function that supports a radio access protocol according to a radio access technology (RAT) or an entity that performs the corresponding function according to a configuration of the core network.

When a dual connectivity function is supported, the terminal may configure connections with a plurality of base stations and receive services from the plurality of connected base stations. According to roles of the base stations supporting the dual connectivity function for the terminal, the base stations may be classified into a master base station and a secondary base station(s). Hereinafter, 'dual connectivity' may include dual connectivity using multiple base stations using the same radio access technology (RAT) and dual connectivity using multiple base stations using different RATs (e.g., MR-DC: Multi-Radio Dual Connectivity).

Here, the master base station (or node) may refer to a node that mainly performs a radio resource control (RRC) function and supports a control plane connection function with a core network in order to support the dual connectivity function. The master node may be composed of a plurality of cells, and the plurality of cells constituting the master node may be referred to as a 'master cell group (MCG)'. An MCG bearer means a bearer that follows only the logical channel configuration of radio link control (RLC) and MAC layers of the cell belonging to the MCG.

In addition, the secondary base station (or node) may refer to a node that does not support a control plane connection function with the core network, and provides a service by using additional radio resources to the terminal in order to support the dual connectivity function. The secondary node may be composed of a plurality of cells, and the plurality of cells constituting the secondary node may be referred to as a 'secondary cell group (SCG)'. The SCG bearer means a bearer that follows only the logical channel configuration of RLC and MAC layer of the cell belonging to the SCG.

Meanwhile, a split bearer may be a bearer that uses both the logical channel configurations of the MAC and RLC layers of the MCG and SCG. The split bearer may be classified into a secondary node (SN) terminated bearer or a master node (MN) terminated bearer according to the type of node performing a packet data convergence protocol (PDCP) function. The MN terminated bearer is a bearer in which the PDCP function for the corresponding bearer is performed in the master node, and the SN terminated bearer is a bearer in which the PDCP function for the corresponding bearer is performed in the secondary node.

Figure 3:
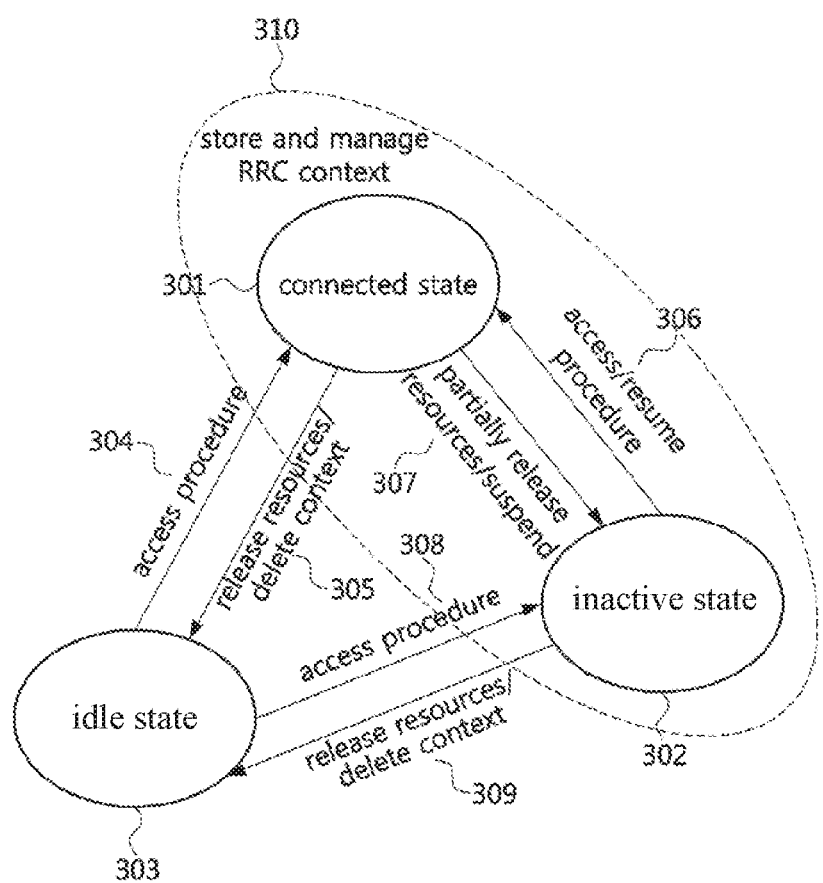
FIG. 3 is a state transition diagram for describing an example of state management for a terminal applied to exemplary embodiments of the present disclosure.

FIG. 3 is a state transition diagram for describing an example of state management for a terminal applied to exemplary embodiments of the present disclosure.

The terminal may operate in a connected state 301, an inactive state 302, or an idle state 303 according to a connection configuration state with the base station providing services. The terminal in the connected state 301 and the inactive state 302 may store and manage RRC context information together with the base station (310). When the terminal transitions to the idle state 303 through a procedure 305 or 309, the RRC context information may be deleted. Here, the RRC context information may include an identifier assigned to the corresponding terminal, and may additionally include parameters configured for protocol data unit (PDU) session information, security key, capability information, and the like.

The terminal in the idle state 303 may monitor a downlink signal or perform a measurement operation in an on-duration period or an active time according to a discontinuous reception (DRX) cycle configured for a low power consumption operation, so as to perform a cell selection or reselection operation to camp on an optimal base station (or, cell). The terminal may acquire system information to camp on a new cell. The terminal may request required system information when necessary. In addition, the terminal may perform an operation for receiving a downlink paging message in the on-duration period or the active time according to configured paging occasions.

The terminal in the connected state 301 may establish a radio bearer (e.g., a data radio bearer (DRB) or a signal radio bearer (SRB)) with the serving cell (or base station) and store and manage RRC context information required in the connected state. The terminal in the connected state may monitor a physical downlink control channel (PDCCH) by using the stored and managed RRC context information and connection configuration information from the base station, and receive a downlink packet scheduled and transmitted by the serving cell or transmit a packet to the serving cell by using uplink grant information. The mobility function for the terminal in the connected state 301 may be performed through a handover procedure when the cell is changed. For such the handover procedure, the terminal may perform a measurement operation on the serving cell or neighbor cells according to measurement or reporting parameters configured by the serving cell, and report the result to the serving cell. In addition, the terminal in the connection state 301 may perform the DRX operation according to DRX operation configuration parameters for the connection state configured by the serving cell. The terminal in the connected state 301 performing the DRX operation may perform a PDCCH monitoring operation in the on-duration period or the active time according to the DRX cycle.

The terminal in the inactive state 302 may store and manage RRC context information required in the inactive state. The terminal in the inactive state 302 or the idle state 303 may perform the DRX operation according to the DRX parameters configured by the last serving cell. Depending on the DRX cycle, the terminal may perform a cell selection or reselection operation for camping on an optimal base station (or cell) by monitoring a downlink signal or performing a measurement operation in the on-duration period or the active time. The terminal may acquire system information to camp on a new cell. The terminal may request required system information when necessary. In addition, the terminal in the inactive state or the idle state may perform an operation for receiving a downlink paging message in the on-duration period or the active time according to configured paging occasions.

A beamforming technique may be applied for transmission and reception through a radio link between the base station (or cell) and the terminal. A signal transmitted by the terminal may be used to provide mobility between base stations or to select an optimal beam within the base station. The terminal may be provided with services by establishing a connection(s) with one or more cells (or base stations). Alternatively, the terminal may exist in a service area of the corresponding base station in a state in which only connection configuration is maintained (e.g., state in which access stratum (AS) context information is stored and managed) or in a state in which the terminal does not have connection configuration.

In the mobile communication system using the base station to which the beamforming technique is applied in a high frequency band, a beam level mobility support function that changes a configured beam of the terminal within the base station, and a mobility support and radio resource management function that changes the configured beam and radio link configuration between base stations (or cells) may be considered.

In order to perform the mobility support and radio resource management function, the base station may transmit a synchronization signal or a reference signal for the terminal to search or monitor. In case of a base station using a frame format supporting a plurality of symbol lengths to support multi-numerology, monitoring by the terminal may be performed for a synchronization signal or a reference signal configured with an initial numerology, default numerology, or default symbol length.

Here, the initial numerology or the default numerology may be a configuration of a frame format applied to radio resources in which a UE-common search space is configured, a frame format applied to radio resources in which a control resource set (CORESET) ZERO (or, CORESET #0) of physical downlink control channels of the 3GPP new radio access technology (New RAT, NR) system is configured, or a frame format applied to radio resources through which a synchronization symbol burst for identifying a cell in the 3GPP NR system is transmitted.

Here, the frame format may refer to information on configuration parameters (e.g., values of the configuration parameters, offset, index, identifier, range, periodicity, or interval (or, duration), etc.) such as a subcarrier spacing (SCS) configuring a radio frame (or subframe), a control channel configuration (e.g., configuration of CORESET), a symbol (or slot) configuration, a reference signal configuration, or the like. The information on the frame format may be transferred to the terminal using system information or a dedicated control message.

In addition, the terminal, which has configured a connection with the base station, may perform a beam management operation by monitoring a configured beam or an activated beam through transmission of an uplink dedicated reference signal configured by the base station or reception of a downlink dedicated reference signal configured by the base station.

For example, the base station may transmit a synchronization signal (SS) and/or a downlink reference signal so that terminals in its service coverage can search for itself to perform downlink synchronization maintenance, beam configuration, or radio link monitoring operations. Also, the terminal, which has configured a connection with the serving base station, may receive physical layer radio resource configuration information for connection configuration and radio resource management from the serving base station.

Here, the physical layer radio resource configuration information may mean configuration parameters in RRC control messages of the LTE or NR system, such as PhysicalConfigDedicated, PhysicalCellGroupConfig, PDCCH-Config, PDCCH-ConfigSIB1, ConfigCommon, PUCCH-Config, RACH-ConfigCommon, RACH-ConfigDedicated, RadioResourceConfigCommon, RadioResourceConfigDedicated, ServingCellConfig, ServingCellConfigCommon, or the like, and may include the following information. The configuration information may include parameter values such as a configuration (or allocation) periodicity of a corresponding signal (or radio resource) based on a frame format of a base station (or transmission frequency), position information of a radio resource for transmission in a time domain/frequency domain, a transmission (or allocation) time, or the like. Here, the frame format of the base station (or transmission frequency) may mean a frame format having a plurality of symbol lengths according to a plurality of SCS within one radio frame to support multi-numerology. That is, the number of symbols constituting mini-slots, slots, and subframes that exist within one radio frame (e.g., a frame of 10 ms) may be configured differently.

(1) Configuration information of transmission frequency and frame format of base station Transmission frequency information: information on all transmission carriers (i.e., cell-specific transmission frequency) in the base station, information on BWPs in the base station, information on a transmission time reference or time difference between transmission frequencies in the base station (e.g., transmission periodicity or offset parameter indicating the transmission reference time (or time difference) of the synchronization signal), etc.

Frame format information: configuration parameters of a mini-slot, slot, subframe that supports a plurality of symbol lengths according to SCS.

(2) Configuration information of downlink reference signal (e.g., channel state information-reference signal (CSI-RS), common reference signal (Common-RS), etc.)

Configuration parameters such as a transmission periodicity, a transmission position, a code sequence, or a masking (or scrambling) sequence for a reference signal commonly applied in the coverage of the base station (or beam).

(3) Configuration information of uplink control signal

Configuration parameters such as a sounding reference signal (SRS), uplink beam sweeping (or beam monitoring) reference signal (RS), uplink grant-free radio resources, or uplink radio resources (or RA preamble) for random access, etc.

(4) Configuration information of physical downlink control channel (PDCCH)

Configuration parameters such as a reference signal for PDCCH demodulation, a beam common reference signal (e.g., a reference signal that can be received by all terminals in a beam coverage), a beam sweeping (or beam monitoring) reference signal, a reference signal for channel estimation, etc.

(5) Configuration information of physical uplink control channel (PUCCH)

(6) Scheduling request signal configuration information (7) Configuration information for a feedback (ACK or NACK) transmission resource for supporting HARQ functions, etc.

(8) Number of antenna ports, antenna array information, beam configuration or beam index mapping information for application of beamforming techniques (9) Configuration information of downlink and/or uplink signals (or uplink access channel resource) for beam sweeping (or beam monitoring)

(10) Configuration information of parameters for beam configuration, beam recovery, beam reconfiguration, or radio link re-establishment operation, a beam change operation within the same base station, a reception signal of a beam triggering handover execution to another base station, timers controlling the above-described operations, etc.

In case of a radio frame format that supports a plurality of symbol lengths for supporting multi-numerology, the configuration (or allocation) periodicity of the parameter constituting the above-described information, the time-domain and frequency-domain position information of the radio resource, or the transmission (or allocation) time may be information configured for each corresponding symbol length (or subcarrier spacing).

In the following description, 'Resource-Config information' may refer to a control message for radio resource configuration including at least one parameter among the above-described physical layer radio resource configuration information. In the following description, a property or setting value (or range) of an information element (or parameter) transmitted by the corresponding control message may have a meaning, rather than the name of 'Resource-Config information'. Thus, the information element (or parameter) conveyed by the Resource-Config control message may be radio resource configuration information which is commonly applied to the entire base station (or beam) coverage or dedicatedly allocated to a specific terminal (or terminal group). The configuration information of the above-described Resource-Config information may be configured as one control message or may be configured as different control messages according to the property of the configuration information. In addition, the beam index may be represented without distinction between transmission beam indexes and reception beam indexes by using an index (or identifier) of a reference signal mapped or associated with the corresponding beam, or an index (or identifier) of a transmission configuration indicator (TCI) state for beam management.

Therefore, the terminal in the connected state may be provided with services through a beam configured with the serving cell (or base station). The terminal may search or monitor a downlink radio channel by using a downlink synchronization signal (e.g., synchronization signal/physical broadcast channel (SS/PBCH) block of the 3GPP NR system) or a downlink reference signal (e.g., channel state information-reference signal (CSI-RS) of the NR system) of the serving cell. Here, that the beams are configured (or beam paired) and services are provided may mean that packets are transmitted or received through an activated beam among one or more configured beams. In the 3GPP NR system, activation of a beam may mean that a configured TCI state is activated.

In addition, when the terminal is in an idle state or an inactive state, the terminal may search for or monitor a downlink radio channel using parameters obtained or configured from the system information or common Resource-Config information. Further, the terminal may attempt access or transmit control information using an uplink channel (e.g., a random access channel or a physical layer uplink control channel).

Through such the radio link monitoring (RLM) operation, the terminal may detect a radio link problem. Here, the detection of a radio link problem means that there is an error in configuring or maintaining physical layer synchronization for the corresponding radio link. That is, this means that it is detected that the physical layer synchronization of the terminal has not been maintained for a certain time. When a radio link problem is detected, a radio link recovery operation may be performed. If the radio link problem is not recovered, a radio link failure (RLF) may be declared, and a radio link re-establishment procedure may be performed.

A physical layer (Layer 1 or physical layer), Layer 2 functions such as Medium Access Control (MAC), Radio Link Control (RLC), Packet Data Convergence Protocol (PDCP), etc., or Layer 3 functions such as Radio Resource Control (RRC) of the radio protocol constituting the radio link may participate in the procedures such as the detection of a physical layer problem in a radio link, the radio link recovery, the radio link failure detection (or declaration), and the radio link re-establishment according to the radio link monitoring operation.

The physical layer of the terminal may receive a downlink synchronization signal and/or a reference signal (RS) to monitor the radio link. In this case, the reference signal may be a base station common reference signal (Common RS) or a beam common reference signal, or a dedicated reference signal allocated to the terminal (or terminal group). Here, the common reference signal refers to a reference signal that can be received by all terminals within the coverage (or service area) of the corresponding base station or beam to estimate a channel. In addition, the dedicated reference signal refers to a reference signal that can be received and used for channel estimation only by a specific terminal or terminal group within the coverage of the base station or the beam.

Therefore, when the base station or the configured beam is changed, the dedicated reference signal for managing the changed beam may be changed. This means that a procedure for selecting another beam from among the beams configured through the configuration parameters between the base station and the terminal or changing the configured beam is required. In the 3GPP-based NR system, changing the beam means that an index of another TCI state is selected among the indexes (or identifiers) of the configured TCI states or a new TCI state is configured and changed to an active state. Configuration information on the common reference signal may be obtained by the terminal through system information. Alternatively, in case of a handover in which the base station is changed or in case of connection reconfiguration, the base station may transmit the configuration information on the common reference signal to the terminal through a dedicated control message.

According to configuration conditions of the radio protocol layers of the base station (or cell), information for identifying the corresponding transmitting base station may be transferred to the terminal by using a control message of the RRC layer or the MAC layer, or a physical layer control channel. In this case, the information for identifying the transmitting base station (or transmission node) may include an identifier of the base station (or transmission node), reference signal information, information on a configured beam (or configured TCI state), information on a sequence (or scrambling) identifier for the base station (or transmission node), or the like.

The reference signal information may be a radio resource of a reference signal allocated for each transmitting base station, sequence information or index information of the reference signal, or sequence information or index information of a dedicated reference signal allocated to the terminal. Here, the radio resource of the reference signal may mean parameters indicating a symbol position on a time axis at which the reference signal is transmitted and a relative or absolute subcarrier position on a frequency axis within a radio resource region such as a frame, subframe, or slot. Such the parameter may be represented by a number or the like sequentially assigned to index, symbol, or subcarrier, which represents a corresponding radio resource element or radio resource set. Hereinafter, the reference signal information may refer to the above-described transmission periodicity, the code sequence or masking (or scrambling) of the reference signal, the radio resource of the reference signal, index information, or the like. The reference signal identifier may refer to a parameter (e.g., resource ID, resource set ID) that can distinguish the corresponding reference signal information uniquely among one or more reference signal information.

The information on the configured beam may be an index (or identifier) of the configured beam (or configured TCI state), configuration information of the corresponding beam (e.g., transmission power, beam width, vertical/horizontal angle, etc.), transmission or reception timing information (e.g., an index or an offset value of subframe, slot, mini-slot, symbol, etc.) of the corresponding beam, or reference signal information or reference signal identifier information corresponding to the corresponding beam.

In addition, the base station may be installed in the air such as a drone, an aircraft, or a satellite to perform the operation of the base station described in the present disclosure.

Accordingly, the terminal may identify a target base station (or transmission node) to perform a beam monitoring operation, a radio access operation, or a transmission/reception operation of a control (or data) packet by using identification information of the transmitting base station (or transmission node), which the base station transmits using the control message of the RRC layer or the MAC layer, or the physical layer control channel.

In addition, where a plurality of beams are configured to the terminal, the base station and the terminal may transmit and receive packet information with all the configured beams, and the number of downlink beams may be the same as or different from the number of uplink beams. For example, a plurality of downlink beams from the base station to the terminal may be configured, and one uplink beam from the terminal to the base station may be configured.

Based on the terminal's report on results of beam measurement or beam monitoring, the base station may change the property (e.g., primary beam, secondary beam, reserved (or candidate) beam, active beam, or deactivated beam) of the beam (or property of the TCI state). Here, when the TCI state is changed, the property of the TCI state may be changed to a primary TCI state, a secondary TCI state, a reserved (or candidate) TCI state, a configured TCI state, an active TCI state, a deactivated TCI state, or the like.

As described above with respect to the property of the TCI state, a state in which a data packet or control signaling can be transmitted or received even in a limited manner, such as the primary TCI state or the secondary TCI state, may be assumed as the active TCI state or a serving TCI state. Also, a state in which it is a target of measurement or management, but data packets or control signaling cannot be transmitted or received, such as the reserved (or candidate) TCI state, may be assumed as the deactivated TCI state or configured TCI state.

The change of the property of the beam (or TCI state) may be controlled at the RRC layer or the MAC layer. When changing the property of the beam (or TCI state) at the MAC layer, the MAC layer may notify the higher layer of the beam property change. In addition, the change of beam property may be transferred to the terminal using a control message of the MAC layer or a physical layer control channel (e.g., a physical downlink control channel (PDCCH) of the LTE (or NR) system). Here, when the physical layer control channel is used, the control information may be configured in form of downlink control information (DCI), uplink control information (UCI), or a separate indicator (or field information) of the LTE (or NR) system.

The terminal may request to change the TCI state property based on the beam measurement or monitoring results. The control information or feedback information for requesting the change of the TCI state property may be transmitted using a physical layer control channel, a MAC layer control message, or an RRC control message. The control message, signaling information, or feedback information for changing the TCI state property may be configured using at least one or more parameters from the above-described information on configured beam.

The property change of the beam (or TCI state) described above may mean a change from the active beam to the deactivated beam or reserved (or candidate) beam, or a change from the primary beam to the secondary beam or reserved (or candidate) beam, or vice versa. That is, it means that the property of the beam is changed between the beam properties described above, and the change of beam property may be performed in the RRC layer or the MAC layer. If necessary, the beam property change may be performed through partial cooperation between the RRC layer and the MAC layer.

In addition, when a plurality of beams are allocated, a beam for transmitting a physical layer control channel may be configured and operated. That is, a physical layer control channel may be transmitted using all the multiple beams (e.g., the primary beam or the secondary beam) or a physical layer control channel may be transmitted using only the primary beam.

Here, the physical layer control channel is a channel such as PDCCH or PUCCH of the LTE (or NR) system, and may transmit scheduling information including radio resource element (RE) allocation and modulation and coding scheme (MCS) information, channel quality indication (CQI), preceding matrix indicator (PMI), feedback information such as HARQ ACK/NACK, resource request information such as scheduling request (SR), beam monitoring result (or TCI state ID) for supporting beamforming function, measurement information on active or inactive beams, or the like.

In the above description, the radio resource may be configured by frequency-axis parameters such as center frequency, system bandwidth, subcarriers, or the like and time-axis parameters according to a unit of transmission (or reception) time (or, periodicity, interval, window) such as radio frame, subframe, transmission time interval (TTI), slot, mini-slot, symbol, or the like. Additionally, the radio resource may refer to a resource occupied for transmission in the radio section by applying a hopping pattern of the radio resource, a beam forming technique using multiple antennas (e.g., beam configuration information, beam index), or a code sequence (or bit sequence or signal sequence). In case of such the radio resource, the name of the physical layer channel (or transport channel) may vary according to the type (or property) of data or control message to be transmitted, uplink, downlink, sidelink (or side channel), or the like.

Such the reference signal for beam (or TCI state) or radio link management may include a synchronization signal such as a synchronization signal (SS) or a synchronization signal block (SSB), a channel state information reference signal (CSI-RS), a phase tracking (PT-RS), a sounding reference signal (SRS), a demodulation reference signal (DM-RS), or the like. A reference parameter for reception quality of the reference signal for beam (or TCI state) or radio link management may be configured as a parameter such as a measurement unit time, a measurement interval, a reference value indicating a degree of improved change, a reference value indicating a degree of deteriorated change, or the like. The measurement unit time or measurement interval may be configured as an absolute time reference (e.g., ms, sec, etc.), transmission timing interval (TTI), a radio channel configuration such as symbol, slot, (sub)frame, scheduling periodicity, etc., an operation periodicity of the base station or terminal, or the like. Also, the reference value representing the degree of change in reception quality may be configured as an absolute value (dBm) or a relative value (dB). Also, the reception quality of the reference signal for beam (or TCI state) or radio link management may be represented by Reference Signal Received Power (RSRP), Reference Signal Received Quality (RSRQ), Received Signal Strength Indicator (RSSI), Signal-to-Noise Ratio (SNR), Signal-to-Interference Ratio (SIR), or the like.

Meanwhile, in the 3GPP NR system using the millimeter frequency band, a bandwidth part (BWP) concept is applied to secure flexibility of operating a channel bandwidth for packet transmission. The base station may configure up to four BWPs having different bandwidths to the terminal. The BWPs may be configured independently for downlink and uplink. Each BWP may have not only a different bandwidth but also a different subcarrier spacing (SCS).

For example, the terminal in the connected state 301 described in FIG. 3 may measure signal qualities of radio links for the serving cell or cells that are measurement objects (e.g., neighbor cell, target cell, candidate cell, and the like) based on synchronization signal/physical broadcast channel (SS/PBCH) blocks or CSI-RS. Here, the signal quality may be expressed by RSRP, RSRQ, RSSI, SNR, SIR, or SINR, which are referred to as the reception performance of the reference signal for radio link management or the beam (or TCI state) described above.

In addition, the terminal in the inactive state 302 or the idle state 303 of FIG. 3 may measure signal qualities (e.g., RSRP, RSRQ, SINR, RSSI, or the like) of radio links for the serving cell (or camped cell) or neighbor cells according to a configured DRX cycle (e.g., measurement cycle) based on the SS/PBCH blocks. The terminal may perform a cell selection or reselection operation based on the measurement result. For the measurement on the serving cell (or camped cell), the terminal may obtain, through system information of the corresponding cell, information on a transmission periodicity (e.g., ssb-PeriodicityServingCell information) of the acquired SS/PBCH block or configuration information (e.g., ssb-PositionsInBurst information) of radio resources through which the SS/PBCH block is transmitted. In addition, for the measurement on the neighbor cells, the terminal may acquire signal measurement time configuration (SMTC) window information through the system information. When the terminal in the inactive state 302 or the idle state 303 performs the cell selection or reselection operation based on the measurement of the SS/PBCH blocks, if a change in a radio access network (RAN) area or a tracking area (TA) is recognized, the terminal may perform a RAN area or tracking area update procedure.

Figure 4:
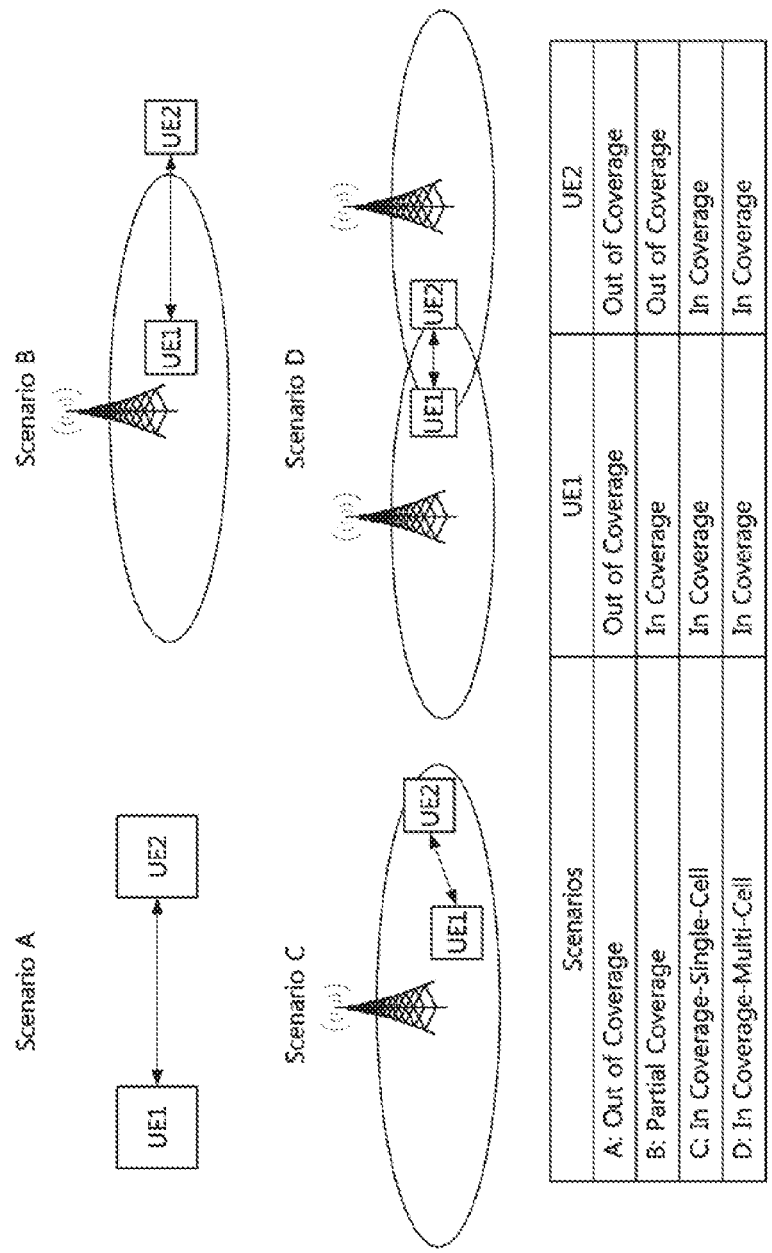
FIG. 4 is a conceptual diagram illustrating scenarios of direct communication between terminals based on a mobile communication network.

FIG. 4 is a conceptual diagram illustrating scenarios of direct communication between terminals based on a mobile communication network.

In FIG. 4, in support of a direct communication function based on a mobile communication network, scenarios for direction communication, which are related to coverages of cells (or, base stations (Node B), access points (APs), transmission and reception points (TRPs), etc.), are shown.

As shown in FIG. 4, a scenario A is a case in which there is no mobile communication cell (or base station, node, etc.) capable of providing services to terminals (i.e., UE1 and UE2) performing direct communication. Such the case is classified as an 'out-of-coverage' case, and in this case, resource allocation and control signaling for direct communication may be performed in a distributed control scheme.

Scenarios C and D are cases in which terminals (i.e., UE1 and UE2) performing direct communication are located in a service coverage of an arbitrary cell (or base station, AP, node, etc.) capable of providing services. The scenario C is a case in which terminals (i.e., UE1 and UE2) performing direct communication are located in a service coverage of the same cell (or node) (i.e., 'in coverage-single-cell' case).

The scenario D is a case in which terminals (i.e., UE1 and UE2) performing direct communication are located in service coverages of different cells (or nodes) (i.e., 'in coverage-multi-cell' case).

The scenario B is a case in which one terminal (i.e., UE1) among terminals performing direct communication is located in a service coverage of a mobile communication cell and the other terminal (i.e., UE2) is located outside the service coverage of the mobile communication cell. Such the case may be classified as a 'partial coverage' case.

For allocation of radio resources for sidelink (SL) (or PC5 interface) between the terminals for direct communication, a base station control scheme or a distributed control scheme (or terminal determination scheme) may be applied according to configuration (or operation) of the mobile communication network.

The base station control scheme (or mode 1) is a scheme in which a base station allocates resources through scheduling. That is, a terminal performing direct communication based on the mode 1 may transmit control information and data for direct communication by using a sidelink radio resource allocated by the base station. That is, since the base station allocates resources from an available direct communication resource pool, control information and data can be transmitted without collision between terminals performing direct communication.

On the other hand, the distributed control scheme (or terminal determination scheme (or mode 2) is a scheme in which a terminal performing direct communication independently selects a transmission resource from a radio resource pool for direct communication, which is configured by a system (or, base station (or cell)), and transmits control information and data by using the selected transmission resource. Accordingly, the terminal performing direct communication based on the mode 2 can transmit control information and data by using a radio resource randomly selected from the radio resource pool for direct communication. Therefore, a collision may occur between sidelink radio resources used by terminals performing direct communication.

Figure 5:
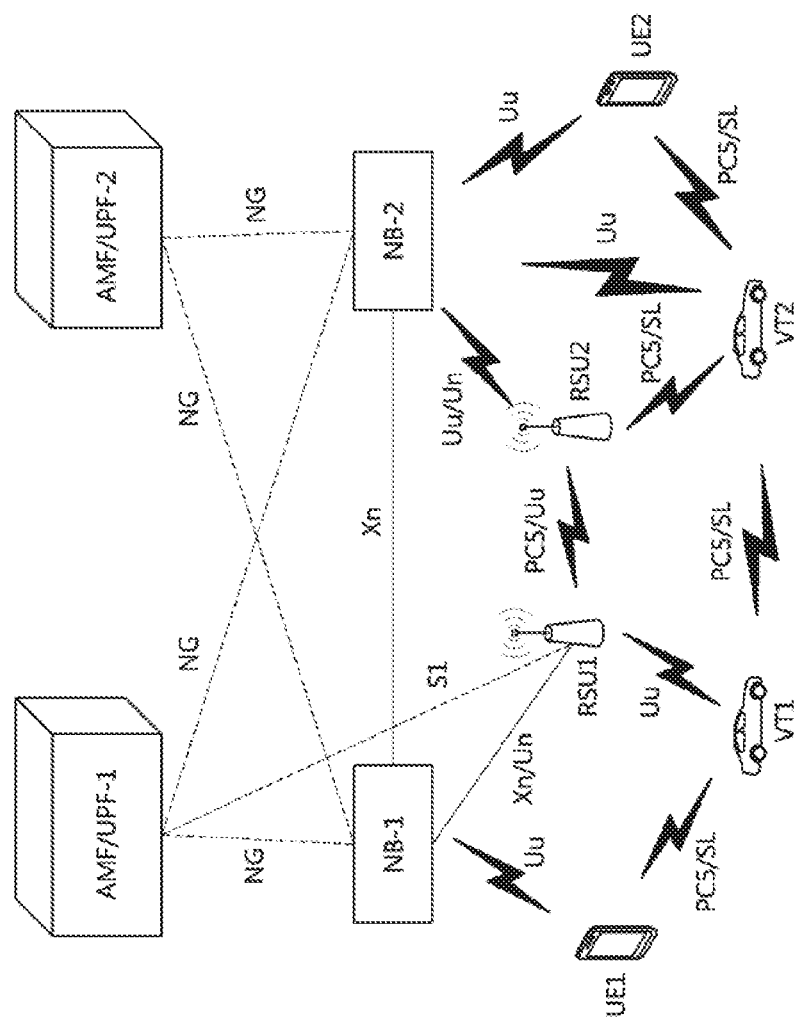
FIG. 5 is a conceptual diagram illustrating network interfaces of a mobile communication network-based vehicle communication system.

FIG. 5 is a conceptual diagram illustrating network interfaces of a mobile communication network-based vehicle communication system.

Base stations NB-1 and NB-2 may exchange packet messages, which are for a control plane in which control information is transmitted and received and a user plane in which traffic data is transmitted and received, through NG interfaces with an access and mobility management function (AMF) or a user plane function (UPF).

In addition, a road side unit (RSU) for the vehicle communication system may operate as a base station (or L2/L3 relay node) or as a terminal. An RSU (e.g., RSU1 in FIG. 5) operating as a base station (or L2/L3 relay node) may exchange packet information with the base station through an Xn interface (or, Un interface, when the RSU is a relay node). Also, the RSU may exchange packet information with the AMF (or UPF) through an NG interface. The NG interface is a logical interface and may be physically connected to the AMF (or UPF) via the base station.

On the other hand, an RSU (e.g., RSU2 in FIG. 5) operating as a terminal may exchange packet information with the base station through a Uu interface (or, Un interface, when the RSU is a relay node).

In addition, a radio section between the RSUs (e.g., RSU1 and RSU2) may exchange packet information by using a PC5 interface for direct communication or a Uu interface between base station and terminal.

In addition, packet information may be exchanged among user terminals UE1 and UE2 and vehicle terminals VT1 and VT2 through a PC5 interface for direct communication (i.e., radio resources or radio channels of a sidelink). In particular, the PC5 interface for direct communication among the user terminals UE1 and UE2 and the vehicle terminals VT1 and VT2 may be an interface for device-to-device (D2D) or V2X communication for an existing user terminal of the 3GPP LTE/LTE-A system. Alternatively, the PC5 interface may be a radio interface or a sidelink radio resource (or radio channel), which is newly defined in the 3GPP NR system or changed from that of the 3GPP NR system.

The vehicle terminal VT1 or VT2 may exchange packet information with the RSU (or layer3/layer2 (L3/L2) relay-type RSU) through a Uu interface (i.e., communication between VT1 and RSU1 in FIG. 5), or may exchange packet information with the base station (or L3/L2 relay-type node) through a Uu interface (i.e., communication between VT2 and NB-2 in FIG. 5). In the above description, 'exchange of packet information' may mean a process of transmitting or receiving control signaling or traffic data packets to each other.

Both of the above-described mode 1 and mode 2 schemes may be applied to resource allocation for direct communication between terminals. A termination node (e.g., cell, eNB, base station, AP, RSU, etc.) of the system may transmit configuration information of a direct communication pool for the mode 1 and mode 2 schemes to the terminals through system information or a dedicated control message.

The direct communication between terminals using a sidelink radio channel may be performed in a broadcast scheme, a groupcast scheme, and a unicast scheme. The broadcast scheme is a scheme in which a transmitting terminal transmits a sidelink radio channel to all terminals capable of receiving the sidelink radio channel. The groupcast scheme is a scheme in which only terminals belonging to a specific group can receive a sidelink radio channel transmitted by a transmitting terminal. In addition, the unicast scheme is a scheme in which a terminal supporting a direct communication function establishes a one-to-one connection with a specific terminal by using a sidelink radio channel and transmits or receives information to or from the specific terminal.

Configuration of Radio Protocols for Direct Communications

Figure 6A:
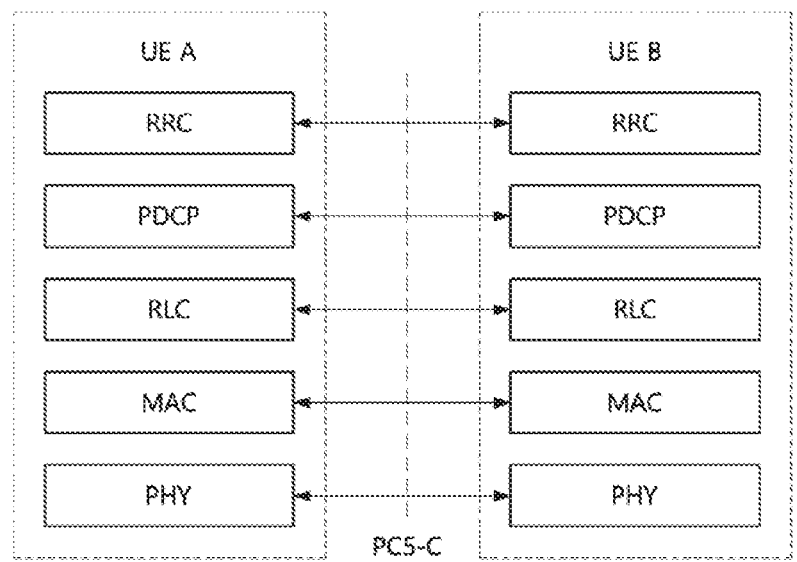
FIGS. 6A and 6B are conceptual diagrams for describing examples of radio protocol configurations of a terminal for direct communication using a sidelink radio channel.
Figure 6B:
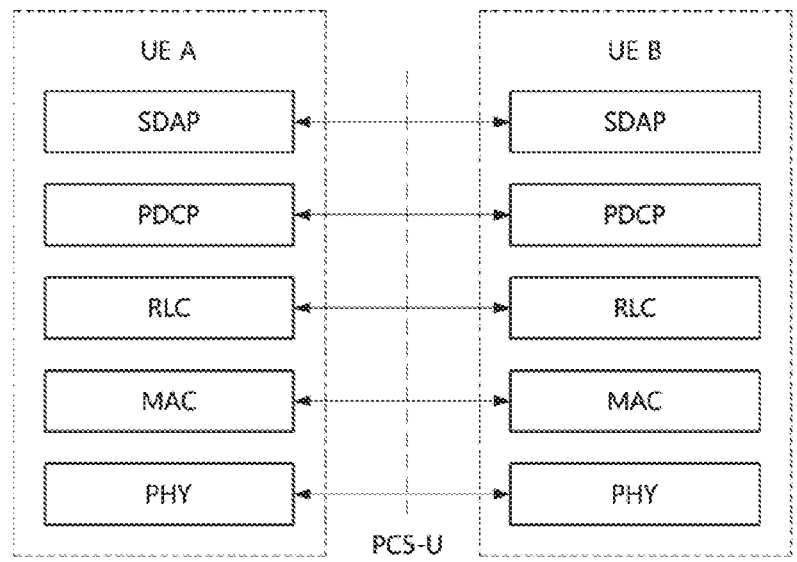

FIGS. 6A and 6B are conceptual diagrams for describing examples of radio protocol configurations of a terminal for direct communication using a sidelink radio channel.

As shown in FIG. 6A, a control plane for transmitting control information may comprise a radio resource control (RRC) layer, a packet data convergence protocol (PDCP) layer, a radio link control (RLC) layer, and a medium access control (MAC) layer, and a physical (PHY) layer. As shown in FIG. 6B, a user plane for transmitting traffic data may comprise a service data adaptation protocol (SDAP) layer, a PDCP layer, an RLC layer, a MAC layer, and a PHY layer.

When a MAC protocol data unit (PDU) (or source data unit (SDU)) is transferred from the MAC layer to the PHY layer, or when a transport block (TB) (or a code block) is transmitted from the PHY layer to a peer terminal, information on a transmission type (i.e., cast type such as broadcast scheme, groupcast scheme, or unicast scheme) of the corresponding MAC PDU or transport block (or code block) may be transferred together with the corresponding MAC PDU between the layers or transmitted to the peer terminal together with the transport block (or code block), so that the transmission type (i.e., cast type) can be identified. As a method for identifying the cast type, a method of using an identifier (ID), a method of using a sidelink control information (SCI) format, a method of including an indicator indicating the cast type in an SCI, and/or the like may be considered.

A method of identifying a cast type by using an identifier (ID) is a method in which a terminal recognizes the cast type based on a source ID (source identifier), a destination ID (destination identifier), or a destination group ID (destination group identifier). The source ID is an ID of a source terminal (i.e., terminal transmitting data), the destination ID is an ID of a destination terminal (i.e., terminal receiving data), and the destination group ID is an ID of a group to which destination terminals belong. In this case, the source ID, destination ID, or destination group ID may be a Layer 2 ID (L2 ID) or a layer 1 ID (L1 ID or PHY ID). For example, the source L1 ID may be configured with a part of the source L2 ID. Alternatively, the source L1 ID and the source L2 ID may be configured using a part of an ID of the terminal. That is, the source L1 ID may be configured using some lower bits (e.g., least significant bits (LSBs)) constituting the source L2 ID, using some lower bits (e.g., LSBs) constituting the ID of the terminal, or using a combination of some lower bits (e.g., LSBs) of the source L2 ID and the ID of the terminal. The destination L1 ID, the destination L2 ID, the destination group L1 ID, and the destination group L2 ID may also be configured by applying the same method. Accordingly, the terminal may identify or recognize the cast type using the L1 ID and/or L2 ID of the source terminal, destination terminal, or destination group.

A method of identifying a cast type by using an SCI format is a method of differently configuring a format constituting SCI that transmits control information such as scheduling information of a sidelink radio channel according to the cast type. That is, the cast type may be identified based on the format of the SCI transmitted to or received from the peer terminal. Accordingly, the attribute(s) (or type(s)) of the parameter(s) constituting the SCI may vary depending on the cast type, or the length(s) of the parameter(s) constituting the SCI may vary depending on the cast type. For example, in the case that the attribute(s) (or type(s)) of the parameter(s) constituting the SCI is configured differently, the SCI for the broadcast scheme may not include the destination ID, and the SCI for the groupcast or unicast scheme may be configured as including the destination ID. In the case that the length(s) of the parameter(s) constituting the SCI is configured differently, the length of the identifier included in the SCI or the length of bit(s) (or byte(s)) constituting the SCI may be configured differently. Alternatively, the cast type may be identified using an SCI format index.

A method of including indication information (i.e., indicator) indicating a cast type in the SCI is a method of applying the indication information indicating the cast type as a field parameter constituting the SCI. For example, in case of a 2-bit field parameter, '11' may indicate the broadcast scheme, '10' may indicate the groupcast scheme, and '01' may indicate the unicast scheme.

As another method of identifying a cast type, a method of differently configuring a sidelink radio resource according to the cast type may be applied. That is, a method, in which time-domain or frequency-domain allocation information of a radio resource through which a sidelink radio channel is transmitted may be configured differently according to the cast type, may be applied.

As yet another method of identifying the cast type, a method of identifying the cast type using an HARQ retransmission scheme or sidelink radio resource allocation information for transmission of feedback information (NACK or ACK) for HARQ retransmission may be applied. For example, when a sidelink radio resource for transmitting HARQ feedback information is not allocated, the cast type may be identified as the broadcast scheme. In addition, when a radio resource of a sidelink feedback channel (e.g., physical sidelink feedback channel (PSFCH)) capable of transmitting NACK-only feedback is allocated, the cast type may be identified as the groupcast scheme. In addition, when a radio resource of a sidelink feedback channel (e.g., PSFCH) capable of transmitting NACK or ACK feedback is allocated, the cast type may be recognized (or identified) as the unicast scheme. The information indicating the HARQ retransmission scheme or the allocation information of the sidelink feedback channel for transmitting feedback information (NACK or ACK) for HARQ retransmission may be transmitted to the terminal by using an RRC layer control message, which establishes a sidelink connection, a MAC control message for sidelink, SCI information, or a control message (or information) transmitted through a separate physical sidelink control channel (PSCCH). When the radio resource of the sidelink feedback channel for transmitting the HARQ feedback information for sidelink is allocated differently according to the groupcast or unicast scheme or element(s) of the allocation information varies according to the groupcast or unicast scheme, the cast type may be identified only by the radio resource allocation information of the sidelink feedback channel for transmitting feedback information.

On the other hand, when the cast type is indicated (or transferred) using the field included in the SCI as described above, a mapping relationship for an associated PSFCH resource may be established based on the cast type indication information of the SCI according to the cast type. That is, the terminal receiving the SCI including the cast type indication information may acquire information on whether to transmit feedback information for a PSSCH received based on the corresponding SCI, information on whether to transmit NACK-only feedback or ACK/NACK feedback for a PSSCH received based on the corresponding SCI, information on a location of a PSFCH resource through which feedback information is transmitted, information of an index of a PSFCH resource, information representing a mapping relationship between the cast type indication information and a PSFCH resource, and/or the like. Here, the mapping relationship between the cast type indication information of the SCI and the PSFCH resource may determine an index of the PSFCH resource for transmitting feedback information for the PSSCH received according to the cast type indication information in the SCI. That is, according to the needs of transmission of the HARQ feedback information (e.g., NACK-only feedback or ACK/NACK feedback), the index indicating the PSFCH resource for transmitting the HARQ feedback information may be determined based on a processing identifier, the L1 or L2 source ID, the L1 or L2 destination ID, and/or the cast type indication information.

Meanwhile, retransmission based on HARQ feedback for a sidelink channel is performed only by a configured maximum number of times, and the maximum number of retransmissions may be configured to the terminal using system information or a dedicated control message. Such the maximum number of retransmissions for sidelink may be configured differently according to a sidelink cast type and/or a sidelink radio resource allocation (or scheduling) scheme (e.g., configured grant (CG) scheme or dynamic grant (DG) scheme). Alternatively, the transmitting terminal may indicate the maximum number of retransmissions or the number of remaining retransmissions to the peer terminal(s) by using an SCI. In addition, the base station may indicate the maximum number of retransmissions or the number of remaining retransmissions for sidelink to the terminal(s) by using a DCI(s).

In the method of identifying the cast type using the HARQ retransmission scheme or the radio resource allocation information of the sidelink feedback channel for transmitting the feedback information for the HARQ retransmission, the terminal may use only the information on the HARQ retransmission scheme of the sidelink radio channel for direct communication to acquire information on whether only NACK is transmitted or ACK/NACK is transmitted as the HARQ feedback information for the sidelink channel according to a sidelink reception result (e.g., CRC check result). In addition, the terminal may transmit the feedback information for the sidelink channel for the direct communication service by using the corresponding resource indicated by the obtained radio resource allocation information of the sidelink feedback channel.

As yet another method of identifying the cast type, a method of identifying the cast type of the sidelink channel by using a logical channel identifier (LCID) or an LCID group (e.g., logical channel group (LCG)) may be applied. That is, a range of LCIDs or an LCG ID that can be allocated according to a cast type may be configured, and the base station or the terminal may allocate a different LCID or LCG ID according to cast type information obtained in the step of configuring parameter(s) for the sidelink channel. Accordingly, the transmitting or receiving terminal may identify the cast type by using only the LCID or LCG ID.

For the above-described determination of the cast type, the cast type may be directly represented (or indicated) based on the destination ID, source ID, bit information in the SCI, LCID, LCG ID, and/or the like, or configuration information associating (or mapping) the destination ID, source ID, LCID, or LCG ID with the cast type may be transferred using a MAC layer message or an RRC layer control message.

In the direct communication using a sidelink radio channel, a scheduling function by the RRC layer and/or MAC entity may be performed in consideration of HARQ retransmission. For example, HARQ function and/or HARQ feedback (i.e., ACK/NACK) transmission may be activated or deactivated on a logical channel header (LCH) basis, and information indicating such the HARQ activation or deactivation may be transferred to the terminal (or, peer terminal) using a SCI. Accordingly, when HARQ function and/or HARQ feedback (i.e., ACK/NACK) transmission is activated or deactivated on an LCH basis, resource allocation (or scheduling) for a sidelink radio channel and/or resource allocation for HARQ retransmission should be performed so that MAC SDUs composed only of either HARQ-activated LCHs or HARQ-deactivated LCHs are configured as one MAC PDU. Therefore, triggering and/or transmission of a buffer status report (BSR) or scheduling request (SR), or logical channel priority (LCP)-related functions, which is performed by the terminal, should be performed considering whether the HARQ for the corresponding LCH is activated or deactivated. The LCP-related functions should be performed in consideration of activation or deactivation of the HARQ functions for an LCH belonging to the same destination ID (e.g., destination L1 ID or destination L2 ID). For example, a destination ID (e.g., destination L1 ID or destination L2 ID) corresponding to a high priority LCH may be selected, and MAC SDUs for LCHs having the same attribute on whether HARQ is enabled/disabled, among the LCHs having the same destination ID, may be transmitted as being multiplexed in the same MAC PDU.

For this, a control message (e.g., PC5-RRC message) for establishing an RRC connection between terminals for direct communication may include information on whether HARQ can be activated or deactivated (or configured to be activated or deactivated) for each LCH or LCG as control information (or parameter).

The receiving terminal may select an HARQ process ID by allocating an HARQ process by using the information of HARQ activation or deactivation received through the SCI. Such the HARQ process determination and/or HARQ process ID selection may be performed by distinguishing between sidelink and uplink.

As described above, if the cast type is identified based on the L1 ID and/or L2 ID of the source, destination, or destination group, which is included in the SCI, only the selection (or allocation) of the L1 ID and/or the L2 ID of the source, destination, or destination group may indicate whether HARQ retransmission is activated or deactivated. In this case, a range or a region of the L1 IDs and/or L2 IDs of the source, destination, or destination group, that can be selected (or allocated), may be configured differently depending on whether HARQ retransmission is activated and/or deactivated. In addition, the control information may be predefined in the system, or transmitted to the terminal (or peer terminal) using system information, a dedicated control message, or a PC5-RRC message.

A terminal providing a direct communication service based on the base station control scheme (or mode 1) may configure and manage a correspondence relationship between HARQ operation parameters (e.g., HARQ process ID and/or HARQ feedback information) for a sidelink channel and HARQ operation parameters of a Uu interface (e.g., radio interface between the base station and the terminal). For example, an HARQ process ID received from the peer terminal may not be the same as a corresponding HARQ process ID that the terminal transfers to the base station through the Uu interface. Therefore, a mapping relationship between the HARQ parameters of the sidelink channel and the downlink and/or uplink HARQ parameters of the Uu interface may be configured and managed. When such the mapping (or correspondence) relationship is not configured, the base station and/or the terminal may exchange the HARQ parameters of the sidelink channel in form of a MAC CE through a PDSCH or PUSCH. In this case, the HARQ process ID on the SL channel, bit information representing one or more ACK/NACK feedback information, or L1 ID and/or L2 ID of the source, destination, or destination group may be included in the corresponding MAC CE.

In addition, in the resource allocation or resource selection of the sidelink channel, it may be considered whether to associate an allocated or selected resource with a sidelink feedback channel. In the operation or procedure for scheduling or SL radio resource selection by the RRC layer and/or MAC entity, the sidelink radio resource allocation (or scheduling) or selection may be performed differently according to whether the HARQ function and/or the HARQ feedback (i.e., ACK/NACK) transmission is activated. For example, when the HARQ function (or HARQ feedback transmission) is deactivated, resources may be allocated or selected from an SL radio resource pool that is not associated or mapped with sidelink feedback channels. On the other hand, when the HARQ function (or HARQ feedback transmission) is activated, resources may be allocated or selected from an SL radio resource pool associated with or mapped to sidelink feedback channels. To this end, an SL radio resource pool including radio resources having an association or mapping relationship with sidelink feedback channels and an SL radio resource pool including radio resources that do not have an association or mapping relationship with sidelink feedback channels may be configured separately. Configuration information for the corresponding radio resource pools may be transferred to the terminal using system information or a control message(s). Accordingly, as described above, the base station or the terminal may allocate or select a radio resource from a corresponding SL radio resource pool by considering the association or mapping relationship with the sidelink feedback channels according to whether the HARQ function (or HARQ feedback transmission) is activated. Accordingly, the receiving terminal may recognize whether the HARQ function is activated or whether the HARQ feedback is transmitted, only based on the received SL radio resource.

Meanwhile, common control information for providing a sidelink service, which includes SL radio resource configuration information, may be configured on a validity area basis. Such a validity area may consist of one or more cells. The validity area for SL radio resource configuration may be identified by a SL validity area ID or other identifiers (e.g., cell identifier, tracking area ID, system information area ID, zone ID, or the like), or may be identified by a selective combination of the above-described identifier(s).

SL configuration information for SL BWP, CORESET, and/or SL radio resource pool for a side link service may be configured on a SL validity area basis. For example, if the SL validity area is changed, SL configuration information for SL BWP, CORESET, and/or SL radio resource pool may be changed. Accordingly, even when a serving cell or a cell on which the terminal is camped is changed, if the SL validity area information (or SL validity area ID) maintains identically, the terminal may provide or receive the sidelink service by using the stored SL common configuration information or SL radio resource pool configuration information. However, when the validity area is changed, the terminal receiving the sidelink service or the terminal interested in the sidelink service may perform a procedure for updating the SL common configuration information or request transmission of system information necessary for acquiring SL common configuration information. Alternatively, if terminal reports the change of the SL validity area to the base station, the base station may transmit new SL common configuration information to the terminal.

Method for Establishing PC5-RRC Connection Between Terminals

In order to provide a unicast service in direct communication using a sidelink radio channel, a procedure for establishing or managing a radio link between terminals is required.

FIG. 7 is a sequence chart illustrating an exemplary embodiment of a method for establishing a connection between terminals for direct communication according to the present disclosure.

In FIG. 7, a base station 701 and a base station 702 may be base stations of the same operator or base stations operated by different operators. Further, a terminal 703 and a terminal 704 may be terminals subscribed to the same operator or terminals subscribed to different operators. In addition, the terminals 703 and 704 of FIG. 7 may be terminals installed in vehicles or other type user terminals (e.g., cellular phones, smart phones, machine type communication (MTC) terminals, or Internet of Thing (IoT) terminals, etc.). In addition, the base stations 701 and 702 and the terminals 703 and 704 of FIG. 7 may exchange data packets or control signaling messages by using the interfaces shown in FIG. 5. For example, the base stations 701 and 702 and the terminals 703 and 704 may use the Uu interface (i.e., radio access interface between the base station and the terminal) of the 3GPP LTE/LTE-A system or NR system. In addition, data packets or control signaling messages may be exchanged between the terminals by using a sidelink channel for direct communication (e.g., D2D or V2X direct communication).

The terminals 703 and 704 may perform a direct communication function in the connected state (e.g., RRC connected state), inactive state (e.g., RRC inactive state), or idle state (e.g., RRC idle state) described in FIG. 3. For example, the terminal 703 may establish a connection with the base station 701 and when necessary, the terminal 703 may be allocated resources for direct communication from the base station (i.e., resource allocation according to the above-described mode 1 scheme) (S701). Further, the terminal 704 may be in the idle state (e.g., RRC idle state) without establishing a connection with the base station 702, and may operate in a state of being camped on the base station 702. That is, the terminal 704 may identify resource pool configuration information included in system information received from the base station 702 or resource pool configuration information pre-configured from the base station 702, and be in a state of being capable of performing direct communication (i.e., resource allocation of the above-described mode 2 scheme) (S702).

Establishment of a connection (e.g., PC5-RRC connection) between the terminals capable of being allocated resources from the base station or autonomously selecting resources through the above-described step S701 or S702 may be performed through a sensing/discovery step S710, a PC5-RRC connection establishment step S720, and a PC5-RRC connection release step S740.

Sensing/Discovery Step S710

The terminals 703 and 704 that have been allocated radio resources from the base station or selected radio resources from the resource pool through the steps S701 or S702 may perform a sensing (or discovery) step for direct communication (S710). The sensing/discovery step may be performed for discovery of a peer terminal or sensing for resource selection.

In order to perform the sensing/discovery step of the step S710, the terminals 703 and 704 may transmit a specific signal (hereinafter, a sidelink discovery signal (SL-DS, SL-discovery signal) and/or a sensing signal (S711). In the step S711, the SL-DS transmitted by the terminal may be a sidelink reference signal (SL-RS) having a specific pattern in units of radio resource elements (REs) constituting a sidelink channel or a signal configured with a specific sequence defined for the sensing/discovery purpose. The SL-DS may be periodically transmitted by a terminal or a group of terminals supporting the direct communication function in a period composed of preconfigured radio resources. That is, the SL-DS may be transmitted only in a specific region of subcarriers in the frequency domain according to a configured periodicity in the time domain. Information on the periodicity (or period) and the subcarrier region (or range) may be transmitted to the terminal using system information or a separate control message. Accordingly, the terminal supporting the direct communication function may transmit or monitor the SL-DS in the configured subcarrier region according to the configured periodicity. In addition, the SL-DS of the step S711 may be configured using the entire destination ID or destination group ID or a part of the destination ID or destination group ID described above, or may be scrambled with the entire destination ID or destination group ID or a part of the destination ID or destination group ID. The transmission periodicity of the SL-DS in the step S711 may be configured in alignment with the transmission periodicity of the aforementioned SCI or a multiple of the SCI transmission periodicity. In addition, REs through which the SL-DS is transmitted may be allocated consecutively to the radio resources through which the SCI is transmitted, or may be allocated as being separated from the radio resources through which the SCI is transmitted by a predetermined interval.

Meanwhile, in the step S711, only a sensing signal for radio link monitoring (RLM), radio resource management (RLM), radio link failure (RLF) detection, or beam management (e.g., beam failure recovery (BFR)) of a sidelink channel may be transmitted instead of the SL-DS.

The terminal 703, which is a transmitting terminal, may transmit discovery information (S712). When the SL-DS and/or the sensing signal is transmitted in the step S711 as described above, the discovery information may be transmitted in the step S712. In this case, the discovery information may be transmitted using an SCI of the physical layer or may be transmitted using a control message of the MAC layer or the RRC layer. The corresponding discovery information may include the L1 or L2 ID described above (e.g., source ID, destination ID, destination group ID, or the like).

In the discovery operation among terminals for direct communication, a receiving terminal performing monitoring according to the SL-DS periodicity described above may identify whether there is a sidelink channel to be received (or whether there is a peer terminal (e.g., transmitting terminal)). Alternatively, the receiving terminal may identify whether there is a sidelink channel to be received (or whether there is a peer terminal (e.g., transmitting terminal)) by monitoring the sensing signal. If the presence of the sidelink channel to be received (or the presence of the peer terminal (e.g., transmitting terminal)) is identified through the SL-DS or the sensing signal, the terminal may monitor and receive an SCI channel to receive the above-described discovery information or sidelink channel. The terminal may perform a procedure (or process) for acquiring a packet of a sidelink channel transmitted to itself through reception of the SCI channel.

The terminal 704 receiving the sidelink discovery signal (S711) or the sidelink discovery information (S712) transmitted by the terminal 703 may transmit a response to the sensing signal or the sidelink discovery signal (S713). As a method for the terminal 704 to respond to the peer terminal 703 in the step S713, the terminal 704 may transmit a signal (or control message) defined for the response to the sensing or discovery signal (or, discover information (e.g., control message)). Alternatively, instead of the separate control message, the terminal 704 may transmit an HARQ feedback message for the received discovery information (e.g., control message) to the terminal 703.

In addition, when all of the terminals 703 and 704 select the radio resources of the sidelink channel in the above-described mode 2 scheme, a possibility of collisions in the radio resource selection processes may be reduced or avoided through the sensing/discovery step S710.

PC5-RRC Connection Establishment Step S720

When the sensing/discovery step S710 including the steps S711 to S713 ends successfully, in order to support services of the unicast or groupcast scheme, the terminals 703 and 704 may perform the PC5-RRC establishment step S720 in which control messages (e.g., PC5-RRC connection establishment control messages transferred through an SRB(s)) for establishment of an RRC connection between terminals for direct communication are exchanged. In this case, the terminal 703 and/or the terminal 704 may identify or determine a cast type with the peer terminal using the above-described methods for identifying the cast type. That is, when the cast type for the peer terminal is a unicast or groupcast scheme, the PC5-RRC connection establishment step S720 with the peer terminal may be performed.

In the PC5 RRC connection establishment step S720, the terminal 703 may transmit a control message requesting a PC5 RRC connection establishment to the peer terminal 704 (S721). The terminal 704 requested to establish a PC5 RRC connection may transmit a PC5 RRC establishment response control message to the peer terminal 703 (S722). A control message for accepting or rejecting the PC5 RRC connection establishment may be transmitted as the PC5 RRC establishment response control message in the step S722. The terminal 703 in the RRC connected state or inactive state may transmit a control message reporting that the PC5 RRC connection has been established to the base station 701 (S723).

In the step S721, the RRC control message for establishing the PC5 RRC connection may include at least one of capability information of the terminal, an identifier and configuration information of the terminal, sidelink channel configuration information, version information of a direct communication function specification, and mobility status information of the terminal.

In particular, the capability information of the terminal may include information on whether to support multiple carriers for supporting the direct communication function, frequency bands of the multiple carriers, the maximum number of multiple carriers that can be supported, whether to support MIMO functions, configuration information of maximum supportable MIMO functions, transmission power class information, information on whether to support beamforming functions and related TCI configuration information, and/or information on a type of the terminal. Here, the information on the type of the terminal may mean information identifying whether the terminal is a terminal installed in a vehicle, a normal user terminal, an IoT terminal, an MTC terminal, a fixed terminal, or an RSU device.

The identifier and configuration information of the terminal may include information of an identifier of the terminal for supporting the direct communication function, information on whether a connection is established with the base station, an identifier of the base station to which the terminal is connected or on which the terminal is camped, or geographical location information of the terminal.

The version information of the direct communication function specification may indicate version (e.g., release version) information of the direct communication function specification of the 3GPP LTE/LTE-A or NR system supported by the terminal. The version information may indicate version information of a direct communication function specification of a new communication system to be defined in the future rather than the 3GPP LTE/LTE-A and NR systems.

The mobility status information may mean information that can be used to recognize or can express a movement situation of the terminal at a current time point or for a certain time period from the current time point. For example, the mobility status information may be information such as information on whether the terminal is a fixed terminal, an average movement speed of the terminal, a time for which the terminal remains in a current cell, or the number of cells to which the terminal belongs during a certain time period.

The sidelink channel configuration information transmitted through an RRC and/or PC5-RRC control message may include information on a modulation order and coding scheme (e.g., modulation order or MCS level) supported by the terminal, an identifier of a sidelink bearer, TCI state configuration information, information of a transmission power of a sidelink channel, power control information, timing adjustment (TA) information from the base station, path loss with the base station (or received signal strength), received signal strength information of the peer terminal or an adjacent terminal, and/or an identifier of an adjacent terminal or a measurement result for the adjacent terminal. In addition, an RRC control message and/or PC5-RRC control message (e.g., control message including a sidelink radio bearer (SLRB) configuration parameter) for configuring a sidelink channel for supporting the direct communication function between terminals may include sidelink traffic attributes for a sidelink radio bearer (SLRB), SL radio resource allocation (or configuration) information, a sidelink service identifier, quality of service (QoS) flow identifier (flow ID), source and/or destination L2 ID, and/or the like. Further, the terminal in the inactive state may store the SLRB configuration information configured in the connected state, and use the stored information later. Alternatively, the terminal may receive the SLRB configuration information when the terminal transitions to the inactive state, and the terminal operating in the inactive state may receive a direct communication service between terminals by using the received SLRB configuration information. The SLRB configuration information for the terminal in the inactive state may include SL radio resource allocation (or configuration) information, synchronization configuration type information (e.g., information indicating a synchronization reference allowed for use of the SL radio resource pool), and/or the like. The base station may instruct the terminal to transition to the inactive state, and may transmit the SLRB configuration information to the terminal. Alternatively, the base station may transmit to the terminal a control message including the SLRB configuration information to be used in the inactive state when establishing an RRC connection with the terminal.

In addition, a terminal that desires or is interested in a direct communication service between terminals using a sidelink channel may transmit, to the base station, information on sidelink traffic attributes (e.g., traffic periodicity, transmission interval, message size, or a cast type of SL traffic), a sidelink service identifier, an SLRB identifier, an SL logical channel identifier (LCID), a QoS flow identifier (flow ID), or source and/or destination L2 ID information, and/or the like by using a terminal assistance information (e.g., UE assistance information) message. The UE assistance information message may be transmitted as being included in a control message exchanged during the state transition of the terminal, a connection request control message, or another RRC layer control message, or by using an RRC control message composed of only the UE assistance information.

Inter-Terminal Direct Communication Step S730

The terminals 703 and 704 that have completed the PC5-RRC establishment in the step S721 may perform unicast (or groupcast) direct communication using sidelink channels (S730).

In the step S730 in which the terminals 703 and 704 perform the direct communication, the terminals 703 and 704 may perform transmission power control for sidelink channels and TCI state configuration and control operations for managing transmission beams and reception beams. In order to control a transmission power, the terminal may estimate (or measure) a received strength or path loss of a reference signal transmitted by the peer terminal. In order to measure a received strength or path loss of a reference signal of a sidelink channel between the terminals 703 and 704, the terminals may exchange geographic location information with each other. The path loss may be measured by using the obtained location information of the peer terminal and its own location information, or a transmission power value determined based on a received signal strength of the reference signal may be adjusted.

PC5-RRC Connection Release Step S740

The PC5-RRC connection release step S740 may be performed by at least one of the terminals 703 and 704 performing direct communication. Hereinafter, an example in which the terminal 704 requests to release the PC5-RRC connection will be described. However, the terminal 703 may request to release the PC5-RRC connection establishment.

The terminal 704 that has completed the direct communication of the step S730 may transmit a control message requesting the PC5 RRC connection establishment release to the peer terminal 703 (S731). Upon receipt of the control message requesting to release the RRC connection establishment, the terminal 703 may transmit a PC5 RRC connection establishment release response message to the peer terminal 704 (S732). Alternatively, after transmitting the PC5 RRC connection establishment release request control message of the step S731, if the PC5 RRC connection establishment release response message of the step S732 is not received until a preconfigured timer (e.g., PC5_Release_Timer) expires, the terminal 704 may release the PC5 RRC connection establishment. The PC5_Release_Timer may be started when the terminal 704 transmits the PC5 RRC connection establishment release request message.

The terminal 703 in the RRC connected state or the inactive state may transmit a control message reporting that the PC5 RRC connection has been released to the base station 701 (S733). On the other hand, even when the terminal 703 requests to release the PC5-RRC connection establishment, the terminal 703 may transmit to the base station 701 a control message reporting that the PC5-RRC connection has been released.

In the procedure for establishing a connection between terminals for direct communication described in FIG. 7, all of the steps S701 to 733 may not be necessary to provide the direct communication service using sidelink channels. That is, only a part of the steps S701 to 733 may be performed to provide the direct communication service between terminals.

Meanwhile, when a beam failure detection (BFD), a beam failure recovery (BFR), or a radio link failure (RLF) occurs for a sidelink channel, the terminal may use a Uu interface to transmit control information informing the corresponding situation to the base station. The control information may be transmitted in form of a field parameter of a physical layer control channel, a MAC CE, or an RRC layer control message. When the control information is transmitted as a MAC CE or RRC message, the corresponding control message may include information of a destination ID or SLRB ID where the BFD, BFR, or RLF has occurred or information on an occurrence time of the BFD, BFR, or RLF. Alternatively, a separate LCID may be assigned to the MAC CE for the control information, and the MAC CE to which the separate LCID is assigned may be transmitted. Alternatively, only an LCID indicating the BFD, BFR, or RLF may be transmitted without a MAC CE. Alternatively, when a BFD, BFR, or RLF occurs, the terminal may report the occurrence of the BFD, BFR, or RLF to the base station by an implicit manner of excluding a report of a destination ID or SLRB ID for the corresponding SL from control information reported periodically or aperiodically to the base station. In this case, the base station may determine that the BFD, BFR, or RLF has occurred in the corresponding sidelink channel when the information on the destination ID or the SLRB ID is not received from the terminal for a predetermined time period or a predefined number of times. Here, the control information reported periodically or aperiodically may be control information that the terminal transmits to the base station for maintenance of the sidelink channel and/or service continuity. For example, the control information reported periodically or aperiodically may be a CSI/CQI report, HARQ feedback information, and/or a buffer status report (BSR) for the sidelink channel.

The base station receiving the control information informing the BFD, BFR, or RLF of the sidelink channel in the explicit or implicit manner from the terminal may transmit, to the corresponding terminal, control information for releasing or deactivating SLRB configuration or SL radio resource allocation for the sidelink channel of the corresponding terminal.

The terminal receiving the control information indicating the release or deactivation of the sidelink channel may restart the sidelink service by performing a sidelink reconfiguration procedure or selecting a radio resource in the distributed control scheme (e.g., mode 2 scheme).

The starting (or restarting) time point, ending time point, or stopping time point of the above-described timer, counter, offset, period, or periodicity may be configured in units of symbols, mini-slots, slots, subframes, or frames.

The cell (or base station) of the present disclosure may refer to a road side unit (RSU), a radio remote head (RRH), a transmission point (TP), a transmission and reception point (TRP), or a gNB, in addition to the NodeB, the evolved NodeB, the base transceiver station (BTS), the radio base station, the radio transceiver, the access point, or the access node as the base station described in FIG. 1.

Also, the terminal of the present disclosure may refer to an Internet of Thing (IoT) device, a mounted module/device/terminal, or an on board device/terminal, in addition to the terminal, the access terminal, the mobile terminal, the station, the subscriber station, the mobile station, the mobile subscriber station, the node, or the device as the UE described in FIG. 1.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of establishing a connection for direct communication between terminals, performed in a terminal, the method comprising:
   transmitting a sensing signal or a sidelink discovery signal;
   transmitting sidelink discovery information;
   determining a cast type for the peer terminal;
   in response to determining that the cast type is a unicast scheme or groupcast scheme, establishing a PC5-radio resource control (RRC) connection with the peer terminal;
   in response to determining that the cast type is a broadcast scheme, not establishing a PC5-RRC connection with the peer terminal; and
   performing direct communication with the peer terminal, wherein the cast type is identified by an indicator included in sidelink control information (SCI) transmitted to the peer terminal or received from the peer terminal.

2. The method according to claim 1, further comprising: establishing an RRC connection with a base station; and being allocated a radio resource from the base station, wherein the sensing signal or the sidelink discovery signal is transmitted through the radio resource.

3. The method according to claim 1, further comprising identifying a preconfigured a radio resource pool or receiving configuration information of a radio resource pool, wherein the sensing signal or the sidelink discovery signal is transmitted through a radio resource selected from the radio resource pool.

4. The method according to claim 1, wherein the sensing signal is a signal for radio link monitoring (RLM), radio resource management (RRM), detection of a radio link failure (RLF), or beam management.

5. The method according to claim 1, wherein the sidelink discovery signal is a reference signal having a specific pattern or a signal configured with a specific sequence.

6. The method according to claim 1, wherein the sidelink discovery signal is transmitted in a preconfigured region of subcarriers according to a preconfigured periodicity, and the preconfigured periodicity and/or the preconfigured region of subcarriers is informed by a base station through system information or a control message.

7. The method according to claim 1, wherein the discovery information includes a layer 1 (L1) or layer 2 (L2) identifier (ID) of a source terminal, an L1 or L2 ID of a destination terminal, and/or an L1 or L2 ID of a destination terminal group.

8. The method according to claim 1, wherein the cast type is identified by an L1 or L2 ID of a source terminal, an L1 or L2 ID of a destination terminal, and/or an L1 or L2 ID of a destination terminal group, identified by a format of sidelink control information (SCI) transmitted to the peer terminal or received from the peer terminal, or identified by a hybrid automatic repeat request (HARQ) retransmission scheme for the peer terminal or radio resource allocation information for transmission of HARQ feedback information for the peer terminal.

9. The method according to claim 1, wherein the establishing of the PC5-RRC connection with the peer terminal comprises:
transmitting a control message requesting to establish the PC5-RRC connection to the peer terminal; and
receiving a response message for accepting or rejecting the establishment of the PC5-RRC connection from the peer terminal.

10. The method according to claim 9, wherein the control message requesting to establish the PC5-RRC connection includes at least one of capability information of the terminal, an identifier and configuration information of the terminal, sidelink channel configuration information, version information of a direct communication function specification, and mobility status information of the terminal.

11. A method of establishing a connection for direct communication between terminals, performed in a terminal, the method comprising:
monitoring a sensing signal or a sidelink discovery signal;
receiving sidelink discovery information from a peer terminal;
transmitting a response to the sidelink discovery signal or the sidelink discovery information;
determining a cast type for the peer terminal;
in response to determining that the cast type is a unicast scheme or groupcast scheme, establishing a PC5-radio resource control (RRC) connection with the peer terminal;
in response to determining that the cast type is a broadcast scheme, not establishing a PC5-RRC connection with the peer terminal; and
performing direct communication with the peer terminal,
wherein the cast type is identified by an indicator included in sidelink control information (SCI) transmitted to the peer terminal or received from the peer terminal.

12. The method according to claim 11, wherein the terminal recognizes the peer terminal through monitoring on the sensing signal or the sidelink discovery signal, and receives the sidelink discovery information from the peer terminal.

13. The method according to claim 11, wherein the sensing signal is a signal for radio link monitoring (RLM), radio resource management (RRM), detection of a radio link failure (RLF), or beam management.

14. The method according to claim 11, wherein the sidelink discovery signal is a reference signal having a specific pattern or a signal configured with a specific sequence.

15. The method according to claim 11, wherein the sidelink discovery signal is received in a preconfigured region of subcarriers according to a preconfigured periodicity, and the preconfigured periodicity and/or the preconfigured region of subcarriers is informed by a base station through system information or a control message.

16. The method according to claim 11, wherein the discovery information includes a layer 1 (L1) or layer 2 (L2) identifier (ID) of a source terminal, an L1 or L2 ID of a destination terminal, and/or an L1 or L2 ID of a destination terminal group.

17. A terminal for performing direct communication between terminals, the terminal comprising:
a processor;
a memory electronically communicating with the processor; and
instructions executable by the processor and stored in the memory,
wherein when executed by the processor, the instructions cause the terminal to:
transmit a sensing signal or a sidelink discovery signal;
transmit sidelink discovery information;
determine a cast type for the peer terminal,
in response to determining that the cast type is a unicast scheme or groupcast scheme, establish a PC5-radio resource control (RRC) connection with the peer terminal;
in response to determining that the cast type is a broadcast scheme, not establish a PC5-RRC connection with the peer terminal; and
perform direct communication with the peer terminal,
wherein the cast type is identified by an indicator included in sidelink control information (SCI) transmitted to the peer terminal or received from the peer terminal.

18. The terminal according to claim 17, wherein the sidelink discovery signal is a reference signal having a specific pattern or a signal configured with a specific sequence.

19. The terminal according to claim 17, wherein the sidelink discovery signal is transmitted in a preconfigured region of subcarriers according to a preconfigured periodicity, and the preconfigured periodicity and/or the preconfigured region of subcarriers is informed by a base station through system information or a control message.

20. The terminal according to claim 17, wherein the cast type is identified by an L1 or L2 ID of a source terminal, an L1 or L2 ID of a destination terminal, and/or an L1 or L2 ID of a destination terminal group, identified by a format of sidelink control information (SCI) transmitted to the peer terminal or received from the peer terminal, or identified by a hybrid automatic repeat request (HARQ) retransmission scheme for the peer terminal or radio resource allocation information for transmission of HARQ feedback information for the peer terminal.

* * * * *